United States Patent [19]

Goldenberg

[11] Patent Number: 4,665,123
[45] Date of Patent: May 12, 1987

[54] POLYVINYL ALCOHOL DERIVATIVES CONTAINING PENDANT (METH)ACRYLOYLVINYLIC MONOMER REACTION PRODUCT UNITS BOUND THROUGH URETHANE GROUPS AND HYDROGEL CONTACT LENSES MADE THEREFROM

[75] Inventor: Merrill Goldenberg, Teaneck, N.J.

[73] Assignee: Ciba-Geigy Corporation, Ardsley, N.Y.

[21] Appl. No.: 809,695

[22] Filed: Dec. 13, 1985

[51] Int. Cl.$^4$ ............................ C08F 8/00; G02C 7/04
[52] U.S. Cl. ........................................ 525/59; 525/61; 525/127; 523/106; 351/160 R; 351/160 H
[58] Field of Search ............................ 325/61, 59, 127; 523/106; 351/160 R, 160 H

[56] References Cited

U.S. PATENT DOCUMENTS

| | | | |
|---|---|---|---|
| 4,085,168 | 4/1978 | Milkovich et al. | 525/59 |
| 4,347,198 | 8/1982 | Ohkada et al. | 425/808 |
| 4,426,492 | 1/1984 | Steckler | 525/61 |

Primary Examiner—John C. Bleutge
Assistant Examiner—David W. Woodward
Attorney, Agent, or Firm—Michael W. Glynn; Irving M. Fishman

[57] ABSTRACT

Organic aprotic solvent insoluble polymers which are derivatives of a polyvinyl alcohol, having a weight average molecular weight of at least about 2,000, and containing from about 0.5 to about 90 percent, based on the number of hydroxyl groups in said polyvinyl alcohol, of an addition reaction product of units of the formula

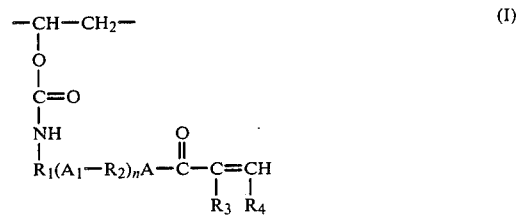

with a vinylic monomer, wherein $R_1$ and $R_2$ are independently alkylene, arylene, cycloaliphatic, aralkylene or aralkarylene, n is 0 or 1, $A_1$ is a carbamoyloxy or ureido linking group, A is an oxa, imino or ureido group, $R_3$ is hydrogen or methyl, $R_4$ is hydrogen, or when $R_3$ is hydrogen, methyl or also —$COOR_5$ where $R_5$ is hydrogen or lower alkyl, and hydrogel contact lenses made therefrom and their preparation.

13 Claims, No Drawings

POLYVINYL ALCOHOL DERIVATIVES CONTAINING PENDANT (METH)ACRYLOYLVINYLIC MONOMER REACTION PRODUCT UNITS BOUND THROUGH URETHANE GROUPS AND HYDROGEL CONTACT LENSES MADE THEREFROM

BACKGROUND OF THE INVENTION

The instant invention relates to polyvinyl alcohol (PVA) derivatives containing pendant (meth)acryloyl units bound to the polyvinyl alcohol backbone, through urethane groups, which are further reacted with a conventional vinylic monomer, and which can be crosslinked to form soft hydrogel contact lenses possessing high oxygen permeability and mechanical strength and capable of being sterilized in either boiling water or dilute hydrogen peroxide solutions.

In general, most existing hydrogel soft contact lens materials are based on HEMA, also known as hydroxyethyl methacrylate or as ethyleneglycol monomethacrylate, with one or more optional comonomers as described in U.S. Pat. Nos. 2,976,576, 3,841,985 and 3,985,697. Other hydrogels based on N-vinylpyrrolidone copolymers and acrylamide copolymers are disclosed in U.S. Pat. Nos. 3,639,524 and 3,929,741. These prior hydrogel polymers generally suffer from several inherent problems (a) relatively weak mechanical strength, low dissolved oxygen permeability or a combination of both (b) most lenses are made by either of two procedures, one requiring costly lathing and polishing steps and the other using delicate spin casting techniques where polymerization, crosslinking, and shaping are done simultaneously.

Polyvinyl alcohol has also been proposed as a contact lens material. Several reagents have been suggested to crosslink PVA for this purpose: formalin and acid catalysis, Japanese Pat. No. 72/06910; dialdehyde of PVA with PVA and acid catalysis, Japanese Patent application No. 50/115258; and glyoxal, U.S. Pat. No. 3,408,429. These PVA crosslinked materials suffer from hydrolyzable acetal or hemiacetal linkages.

Silberman and Kohn, ACS Polymer Preprints 24, 262-3, 465-6 (1983) and J. Polym. Sci. Chem. 23, 327-336 (1985) prepared 2-benzyloxyethyl-methacrylate (BzOEMA) and graft polymerized it onto PVA by anionic and free radical catalysis. Membranes for contact lens applications were prepared by dissolving the PVA-graft-BzOEMA in dimethyl sulfoxide, casting it on a Teflon surface and immersing it in acetone to precipitate a film which is later swollen in water. However such graft polymerization is generally accompanied by oxidation and degradation of the PVA and by the orientation effects in the casting procedure thereby promoting anisotropy in the mechanical properties.

Grafted PVAs have also been made by procedures that do not involve the formation of a radical on a polymer backbone. For example:

In U.S. Pat. No. 4,085,168 (1978) a PVA-graft copolymer useful as a hydrogel contact lens is made by first forming a hydrophobic macromer, such as polystyrene or polymethylmethacrylate, by an anionic mechanism and capping with a polymerizable (meth)acrylate group. This macromer is then copolymerized free radically with vinyl acetate. After hydrolysis of the acetate group a comb-like structure with a PVA backbone and pendant hydrophobic chains of similar molecular weight is produced. Though clear, transparent films can be produced by this method, the actual chemistry involves several complicated steps some of which require moisture sensitive precautions.

Also in U.S. Pat. No. 4,426,492 (1984) certain carboxylated PVA derivatives, useful as disposable, hydrogel soft contact lenses, are disclosed. It is broadly disclosed that certain carboxylated PVA derivatives may be internally plasticized by esterification with a polyglycolether such as poly(ethyleneglycol). However, esterification reactions are normally difficult to be precisely reproduced, and, in addition, mixing problems may be experienced due to phase separation of two high molecular weight polymers.

PVA has been reacted with isocyanates forming urethane linkages, for example:

In U.S. Pat. No. 3,776,889 (1973) PVA has been fully reacted with allylisocyanate for use in a photoresist printing plate composition. In U.S. Pat. No. 3,928,299 (1975), isocyanatoethyl methacrylate (IEM) was reacted with certain hydroxyalkyl methacrylate containing polymers forming a urethane linkage and the polymer used in relief printing plates or circuits to form hard, insoluble coatings.

In U.S. Pat. No. Re. 27,401 (1972) Wichterle and Lim prepared a PVA-methacrylate i.e. a PVA that was esterified 1% with methacrylic acid anhydride, dissolved the same to make a 25% aqueous solution, and polymerized the mixture in a flat mold using potassium persulfate and sodium thiosulfate as initiator to form a hydrogel membrane. This type of hydrogel was disclosed for contact lens use. However, such lenses tend to be fragile.

Also in U.S. Pat. No. 4,347,198 (1982) it is disclosed to mix a hydrophilic component, e.g. N-vinyl pyrrolidone, a hydrophobic component, e.g. methyl methacrylate, crosslinking agent and initiator in a solvent, e.g. dimethyl sulfoxide and crosslink the whole mixture in a mold. After equilibration in water a soft hydrogel contact lens is produced. Similarly a lens is disclosed as produced by mixing a polymethylmethacrylate with pendant vinyl groups with N-vinyl pyrrolidone and polymerizing the mixture. It is also broadly disclosed to use a PVA esterified with methacrylic acid as the hydrophilic component of a contact lens mixture.

It is an object of the present invention to provide polyvinyl alcohol derivatives containing (meth)acryloyl units which are further reacted with a conventional vinylic monomer, and which then can be cross-linked to form a soft water-swellable hydrogel contact lens having high mechanical strength, medium to high water content, superior optical clarity and high oxygen permeabilility.

It is a further object of the present invention to provide aqueous swollen contact lenses obviating, or substantially reducing, the drawbacks of the prior art.

It is a further object of the present invention to provide a method of preparing such contact lenses by crosslinking such polyvinyl alcohol containing (meth)acryloyl unit-vinylic monomer reaction products in an organic aprotic solvent in a mold, such as a spin cast mold or a static cast mold, and equilibrating the resulting aprotic solvent swollen crosslinked contact lens in an aqueous medium.

DETAILED DESCRIPTION OF THE INVENTION

The instant invention provides an organic aprotic solvent insoluble polymer which is a derivative of a polyvinyl alcohol having a weight average molecular weight of at least about 2,000, containing an effective amount between about 0.5 to 90 percent, based on the number of hydroxyl groups on said polyvinyl alcohol, of an addition reaction product of units of the formula $$\begin{array}{c} -CH-CH_2- \\ | \\ O \\ | \\ C=O \\ | \\ NH \quad\quad O \\ | \quad\quad\quad\; \|\\ R_1(A_1-R_2)_nA-C-C=CH \\ \quad\quad\quad\quad\quad | \;\; | \\ \quad\quad\quad\quad\quad R_3 \; R_4 \end{array} \quad (I)$$

with a vinylic monomer
wherein $R_1$ and $R_2$ are independently straight or branched chain alkylene of 2 to 8 carbon atoms, arylene of 6 to 12 carbon atoms, a saturated cycloaliphatic divalent group of 6 to 10 carbon atoms, aralkylene of 7 to 14 carbon atoms, or aralkarylene of 13 to 16 carbon atoms;

n is 0 or 1;

$A_1$ is $$\begin{array}{cc} O & O \;\; R' \\ \| & \| \;\; | \\ -NHC-O- \;\; \text{or} & -NHC-N- \end{array}$$

where R' is hydrogen or lower alkyl;

A is —O—, —NH— or $$\begin{array}{c} R'' \\ | \\ -NHCON- \end{array}$$

where R'' is hydrogen or lower alkyl;

$R_3$ is hydrogen or methyl; and $R_4$ is hydrogen, methyl or —COOR$_5$ where R$_5$ is hydrogen or lower alkyl with the proviso that if $R_3$ is methyl, $R_4$ is hydrogen.

When $R_1$ or $R_2$ are alkylene, they may be straight or branched chain, preferably of 2 to 6 carbon atoms, more preferably straight chain alkylene, and most preferably ethylene. Suitable examples include ethylene, propylene, butylene, hexylene and dimethylethylene.

Where $R_1$ or $R_2$ are arylene, they are preferably phenylene which is unsubstituted or substituted by lower alkyl or lower alkoxy, and more preferably 1,3- or 1,4-phenylene.

Where $R_1$ or $R_2$ are a saturated cycloaliphatic divalent group, such group preferably is cyclohexylene or cyclohexylmethylene which is unsubstituted or substituted by one or more methyl groups, such as the isophorone divalent radical.

Where $R_1$ or $R_2$ are aralkylene, the aryl moiety thereof is preferably phenylene which is unsubstituted or substituted by methyl or methoxy and the alkylene moiety thereof is preferably lower alkylene, such as methylene or ethylene, most preferably methylene.

The divalent group $A_1$—$R_2$ is present when n is 1 and absent when n is 0; those polymers wherein n is 0 are preferred.

$A_1$, when present, is preferably carbamoyloxy. When $A_1$ is a ureido, R' is preferably hydrogen.

A is preferably —O—. When A is ureido, R'' is preferably lower alkyl.

$R_3$ is preferably methyl.

$R_4$ is preferably hydrogen. Where $R_3$ is hydrogen, $R_4$ is methyl or —COOR$_5$, where $R_5$ is preferably methyl or ethyl.

The polyvinyl alcohol polymer derivatives containing units of formula I are easily prepared by reacting a polyvinyl alcohol, having a weight average molecular weight of at least about 2,000, containing i.e. units of the formula $$\begin{array}{c} -CH-CH_2- \\ | \\ OH \end{array} \quad (II)$$

with about 0.5 to about 90 percent, based upon the number of hydroxyl groups in said polyvinyl alcohol, of an isocyanate of the formula $$\begin{array}{c} O \\ \| \\ OCN-R_1(A_1-R_2)_nA-C-C=CH \\ \quad\quad\quad\quad\quad\quad | \;\; | \\ \quad\quad\quad\quad\quad\quad R_3 \; R_4 \end{array} \quad (III)$$

wherein $R_1$, $A_1$, $R_2$, n, A, and $R_3$ are as above defined, and $R_4$ is hydrogen, methyl or —COOR$_5$ where $R_5$ is lower alkyl, at a temperature between about −10° C. to about 100° C. in the presence of a conventional aprotic solvent, in the further presence or absence of a catalytic amount of a urethane catalyst.

To obtain those polyvinyl alcohol polymer derivatives containing units of formula I wherein $R_5$ is hydrogen, the corresponding polymers wherein $R_5$ is lower alkyl can subsequently be treated with aqueous base, such as an alkali metal hydroxide aqueous solution, at an elevated temperature, e.g. between about 40° to about 80° C., followed by neutralization of the resulting carboxylate salt with an acid, such as aqueous hydrochloric acid under ambient conditions.

Suitable aprotic solvents for conducting the reaction between the units of formula II and the isocyanate of formula III include formamide, dimethylformamide, phosphoric acid tri-dimethylamide, N-methyl-2-pyrrolidone, dimethylacetamide, acetamide, acetonitrile and preferably dimethyl sulfoxide.

Suitable urethane catalysts include tertiary amines, such as trimethylamine, triethylamine, N,N-dimethylbenzylamine, or an organo-metallic urethane catalyst, such as stannous octoate or dibutyltin dilaurate, or sodium acetate.

Polyvinyl alcohols containing units of the formula II are widely available.

Preferably, the polyvinyl alcohol has a weight average molecular weight of at least 10,000.

As an upper limit, the polyvinyl alcohol may have a weight average molecular weight of up to 1,000,000. Preferably, the polyvinyl alcohol has a weight average molecular weight of up to 300,000, more preferably up to 100,000, most preferably up to 50,000.

Ordinarily, polyvinyl alcohol predominantely possesses a poly(2-hydroxy)ethylene structure. However, the polyvinyl alcohol starting material may also contain hydroxyl groups in the form of 1,2-glycols, such as copolymer units of 1,2-dihydroxyethylene in the chain, obtained for example, by alkaline hydrolysis of vinyl acetate-vinylene carbonate copolymers.

Moreover, the polyvinyl alcohol may contain minor amounts of copolymer units of ethylene, propylene, acrylamide, methacrylamide, dimethylacrylamide, hydroxyethyl methacrylate, methyl methacrylate, methyl acrylate, ethyl acrylate, vinyl pyrrolidone, hydroxyethyl acrylate, allyl alcohol, styrene and the like.

Commercial polyvinyl alcohol resin may be used such as Vinol®107 manufactured by Air Products (MW=22-31,000, 98-98.8% hydrolyzed). Polysciences 4397 (MW=25,000, 98.5% hydrolyzed), BF 14 by Chan Chun, Elvanol®90-50 by DuPont, UF-120 by Unitika, Mowiol®10-98 and 20-98 by Hoechst. Some other manufacturers are Nippon Gohsei (Gohsenol®), Monsanto (Gelvatol®) Wacker (Polyviol®) as well as the Japanese manufacturers Kuraray, Denki and Shin-Etsu.

As noted above, copolymers of hydrolyzed vinyl acetate can be used and are commercially available such as hydrolyzed ethylene vinyl acetate (EVA), vinyl chloride-vinylacetate, N-vinyl pyrrolidone-vinyl acetate and maleic anhydride-vinyl acetate.

Polyvinyl alcohol is ordinarily prepared by hydrolysis of the corresponding homopolymeric polyvinyl acetate. In a preferred embodiment the polyvinyl alcohol contains less than 50% polyvinyl acetate units, more preferably less than 20% polyvinyl acetate units.

One method of roughly estimating the weight average molecular weight of polyvinyl alcohol is by the viscosity of a 4% aqueous solution at 20° C.: for example a viscosity of 1-2 cP corresponds to a molecular weight of ~3,000, a viscosity of 7 cP corresponds to a molecular weight of ~25,000 (98-100% hydrolyzed) while a viscosity of 60 cP corresponds to a molecular weight of ~130,000 (99-100% hydrolyzed). Preferably the polyvinyl alcohol should have a minimum viscosity of 2 cP and the upper limit of molecular weight is dictated by the ability to stir and pour solutions without introduction of air bubbles—this value is approximately 60-70 cP. It is important to note that the manufacturers' claim of molecular weight (based on viscosity data) does not necessarily correspond to that obtained by gel permeation chromatography (GPC) which is dependent on the standards used. In Table 1 are presented a range of polyvinyl alcohols and the GPC results determined using polyacrylamide standards in aqueous solution.

TABLE 1

| PVA MOLECULAR WEIGHT COMPARISON | | | |
|---|---|---|---|
| | Manufacturers' Claimed | | |
| Manufacturer | $M_w$ | Viscosity, CPS* | GPC, $M_w$ |
| Polysciences | 133,000 | — | 66,000 |
| Scientific Polymer Products | 125,000 | 60 | 45,000 |
| Scientific Polymer Products | 115,000 | — | 69,000 |
| Shin-Etsu Poval C25 | 110,000 | 65 ± 5 | 38,000 |
| Air Products Vinol 350 | 106-110,000 | 55-65 | 43,000 |
| Hoechst, Moviol 66-100 | 100,000+ | 66 ± 4 | 26,000 |
| DuPont, Elvanol HV | 100,000+ | 55-65 | 50,000 |
| Polysciences | 78,000 | 28-32 | 37,000 |
| Sigma | 45,000 | 12-14 | 30,000 |
| Polysciences | 25,000 | 6-8 | 20,000 |
| Aldrich | 14,000 | — | 33,000 |
| Scientific Polymer Products | 14,000 | — | 22,000 |

*4% aqueous solutions at 20° C.

The weight average molecular weight ranges specified in this disclosure are those obtained by GPC using polyacrylamide standards in aqueous solution.

The isocyanates of formula III are known, per se, or are easily prepared by conventional methods well known in the art (see U.S. Pat. No. 2,958,704).

Where, in the compounds of formula III, n equals 1, the isocyanates can be prepared, for example, by reacting substantial equimolar amounts of a compound of the formula $$OCN-R_1-NCO \qquad (IV)$$

with a compound of the formula

where $A_2$ is HO— or $R'$—NH— and $R_2$, A, $R_3$ and $R_4$ are as above defined. Occasionally, it is desirable to employ a substantial excess of the di-isocyanate of formula IV in this reaction, in order to minimize the formation of by product, and subsequently isolate the compound of formula III from the resulting reaction mixture by precipitation thereof, or by distilling off the excess isocyanate. The reaction between the compound IV and compound V can be conducted at a temperature between about 0° C. and 100° C. in the presence or absence of an inert solvent. Suitable solvents include toluene, cyclohexane, methyl acetate, ethyl acetate, tetrahydrofuran, isopropylacetate, diethylether and the like. If desired, the reaction between IV and V may be conducted in the presence of a urethane catalyst of the type described above.

The compounds of formula IV and V are well known in the art. Suitable diisocyanates of formula IV include hexane-1,6-diisocyanate, tetramethylene diisocyanate, phenylene 1,4-diisocyanate, toluene-2,4-diisocyanate, toluene-2,6-diisocyanate, isophorone diisocyanate, cyclohexane 1,4-diisocyanate, and the like.

Suitable compounds of formula V include hydroxyethyl acrylate, hydroxypropyl acrylate, 4-hydroxyphenyl methacrylate, 2-hydroxyethyl maleate, hydroxyethyl methacrylate, t-butylaminoethyl methacrylate, and the like.

Many of the compounds of formula III wherein n is 0 are known or can be prepared by methods known in the art. Known compounds include 2-isocyanatoethyl methacrylate, 2-isocyanatoethyl acrylate, 3-isocyanatopropyl methacrylate, isocyanatobutyl acrylate and methacrylate, isocyanatohexyl acrylate and methacrylate, 1-methyl-2-isocyanatoethyl methacrylate and 1,1-dimethyl-2-isocyanatoethyl acrylate.

The compounds of formula III wherein n is 0 can generally be prepared by esterification of acryloyl or methacryloyl chloride with substantially equal molar amounts of the appropriate alkanol amine of formula (VI)

$$H_2N-R_1(A_1-R_2)_nOH \qquad (VI)$$

under acidic conditions followed by phosgenation, as described in U.S. Pat. No. 2,821,544 (1958). The compounds of formula (VI) are conventional and well known in the art. More specifically the esterification reaction as well as the phosgenation reaction is run using an inert, dry, high-boiling solvent such as toluene, xylene, chlorobenzene or dichlorobenzene at 50°-200° for 1 to 20 hours. The alkanol amine can either be added in the salt form, preferably the hydrochloride salt, or the free form with the solvent saturated with the dry acid e.g. dry HCl gas. After formation of the ester, excess phosgene is passed into or over the rapidly stirring suspension (or solution) at 50°-200° C. for 1 to 20 hours until evolution of hydrogen chloride ceases. The product is isolated by distillation.

The vinylic monomer may be hydrophilic, hydrophobic or may be a mixture of hydrophilic and hydrophobic vinylic monomers. Suitable vinylic monomers include those conventional vinylic monomers generally employed in the fabrication of soft and hard contact lenses. By a hydrophilic vinylic monomer is meant a monomer which, when polymerized by conventional free radical polymerization, characteristically yields a polymer which either dissolves in water or is capable of absorbing at least 10% by weight water under ambient equilibrium conditions. Similarly, suitable hydrophobic vinylic monomers are those monomers which, when polymerized by conventional free radical polymerization, characteristically yield a polymer which neither dissolves in water, nor is capable of absorbing at least 10% by weight water under ambient (i.e. 20° C.) equilibrium conditions.

In general, between about 0.01 and about 80 units of conventional hydrophobic and/or hydrophilic monomer is reacted per unit of formula I.

The polymers of the instant invention preferably contain at least about 1 to about 90 percent, more preferably at least about 1.5 to 90 percent, based on the number of hydroxyl groups on the polyvinyl alcohol, of units of formula I, which are reacted with 0.01 to about 80 units of conventional monomer.

In one preferred sub-embodiment of the instant invention, the polyvinyl alcohol derivative contains at least about 1 to about 20, preferably between about 1.5 to about 20 percent, based upon the number of hydroxyl groups on said polyvinyl alcohol of units of formula I, which are reacted with 0.01 to 80 units of a vinylic monomer per unit of formula I, more preferably between about 0.5 to about 30 units of vinylic monomer per unit of formula I, and most preferably between about 2 to about 20 units of vinylic monomer per unit of formula I present in the polyvinyl alcohol polymer. In this preferred sub-embodiment it is generally desirable to employ a hydrophobic vinylic monomer as the monomer reactant, or alternatively, a mixture of hydrophobic and hydrophilic monomers containing at least 50 weight percent of hydrophobic monomer, based upon total monomer reactant, is employed. The added hydrophobic monomer, or monomer mixture containing predominantly hydrophobic monomer, has been found to increase the mechanical strength of the ultimate final product soft contact lens material, to reduce in a generally predictable manner the amount of water contained in the contact lens material, and reduce the pore size of the contact lens material, thereby reducing the rate of accumulation of proteinaceous and non-proteinaceous debris associated with the normal day to day wearing and handling of contact lenses. Surprisingly, and most unexpectedly, the introduction of hydrophobic monomer, or monomer mixture containing at least 50 mole percent hydrophobic monomer, to the hydrophilic polyvinyl alcohol containing units of formula I does not, upon reaction, result in phase separation of the reaction product. Rather, the product is optically clear, indicating substantially no phase separation.

In an alternate preferred sub-embodiment of the instant invention, the polyvinyl alcohol derivative contains between about 20 to about 50 percent of units of the formula I, based upon said polyvinyl alcohol, which are reacted with about 0.01 to about 20, more preferably with about 0.01 to about 10, most preferably with about 0.05 to about 5 units of vinylic monomer, per unit of formula I present in the polyvinyl alcohol. In this alternate sub-embodiment, the vinylic monomer is hydrophobic or a mixture of hydrophobic monomer and hydrophilic monomer units, wherein up to about 80 weight percent of the total vinylic monomer is hydrophilic. The incorporation of the hydrophilic vinylic monomer component tends to increase the water content, surface wettability and oxygen permeability of the resultant contact lenses. In this embodiment, it is most preferred to employ between about 10 to about 80 weight percent hydrophilic monomer based upon total added vinylic monomer for optimum results.

In a third sub-embodiment, the polyvinyl alcohol derivative contains between about 50 to about 90 percent of units of formula I, based upon said polyvinyl alcohol, which are reacted with about 0.01 to about 20, more preferably with about 0.01 to about 10, most preferably with about 0.05 to about 5 units of vinylic monomer, per unit of formula I present in the polyvinyl alcohol. In this third sub-embodiment it has been found advantageous to employ, as vinylic monomer, a hydrophilic vinylic monomer, or a mixture of hydrophilic and hydrophobic vinylic monomer wherein the hydrophilic component is predominant, i.e. wherein at least 50 percent by weight of total vinylic monomer employed is hydrophilic. In this embodiment, it is most preferred to employ a hydrophilic monomer or a monomer mixture containing between at least 50 percent to about 99 percent by weight hydrophilic monomer, for optimum results.

As is evident from the above three preferred sub-embodiments, as the percent of formula I units increase, from about 1% to about 90%, based upon the hydroxyl units in the polyvinyl alcohol, the added vinylic monomer reacted therewith is generally increasingly hydrophilic in character for an optimum balance of performance characteristics, in terms of mechanical strength, water content, surface wettability and oxygen permeability.

The vinylic monomers are reacted with the polyvinyl alcohol derivative of formula I advantageously in the presence of an inert diluent or solvent, such as a suitable organic solvent, including a lower alkanol, e.g. ethanol, methanol or the like, or an aprotic solvent such as dimethylformamide, acetamide, acetonitrile, dimethylacetamide, dimethylsulfoxide or mixtures thereof. Also, aqueous/organic solvent systems may be employed.

The vinylic monomer, or blend of vinylic monomers, are combined with the polyvinyl alcohol derivative of formula I and polymerized in the presence of actinic radiation or in the presence of a conventional free radical initiator, such as a peroxide, e.g. di-tert-butyl peroxide, benzoyl peroxide, lauryl peroxide, decanoyl peroxide, acetyl peroxide, succinic acid peroxide, methyl ethyl ketone peroxide, 2,4-dichlorobenzoyl peroxide, isopropyl peroctoate, tert-butyl hydroperoxide, tert-butyl perpivalate, tert-butyl peroctoate, diisopropyl peroxydicarbonate, cumene hydroperoxide, tert-butyl perbenzoate, tert-butyl peroxymaleic acid, tert-butyl peroxyacetate, and potassium persulfate, an azo compound, e.g. 2,2-azo-bis-isobutyronitrile, 2,2'-azo-bis-(2,4-dimethylvaleronitrile), 1,1'-azo-bis-(cyclohexane carbonitrile), 2,2'-azo-bis(2,4-dimethyl-4-methoxyvaleronitrile and phenyl azo isobutyronitrile, a photoinitiator, e.g. benzoin methyl ether and 1-hydroxycyclohexylphenyl ketone or actinic radiation such as UV light or ionizing rays e.g. gamma rays or x-rays.

The mixture of polyvinyl alcohol derivative of formula I and monomer is advantageously polymerized upon placement into a mold. The mold may be a conventional spin-casting mold for preparing contact lenses such as described in U.S. Pat. No. 3,408,429, or in a static mold, e.g. as described in U.S. Pat. No. 4,347,198. Alternately, one may prepare a swollen lens blank, dry the lens blank to form the corresponding xerogel, shape the xerogel into a contact lens precurser by lathing methods known to the art, and swell the shaped xerogel in aqueous medium to form the corresponding contact lens, as described in Reissue U.S. Pat. No. 27,401.

The solution of polyvinyl alcohol derivative of formula I and vinylic monomer are advantageously placed into a mold in shape of a contact lens. Where the solvent employed is a strong swelling solvent, such that the resultant polymer shrinks in size upon equilibration with aqueous or aqueous saline solution, typically between about 10 to about 35 percent based on diameter, the mold is suitably enlarged to compensate for the post treatment shrinkage. Optimally the post treatment further includes a heat treatment of the molded lens shaped polymer. Such heat treatment is characteristically conducted at a temperature between about 60° to 100° C., e.g. in the presence of an aqueous medium. This treatment may result in a further slight shrinkage, generally less than 15% based on diameter. The treatment can vary greatly, but usually is accomplished in about 5 to 90 minutes. The purpose of this post treatment is to dimensionally stabilize the crosslinked contact lens material. Also, the treatment may further serve to sterilize lens material.

Suitable vinylic monomers for polymerization with the polyvinyl alcohol derivative of formula I include conventional hydrophobic and hydrophilic monomers. Suitable hydrophobic monomers include, without limitation, $C_1$ to $C_{18}$ alkyl acrylates and methacrylate, $C_3$ to $C_{18}$ alkyl acrylamides and methacrylamides, acrylonitrile, methacrylonitrile, vinyl $C_1$ to $C_{18}$ alkanoates, $C_2$ to $C_{18}$ alkenes, $C_2$ to $C_{18}$ haloalkenes, styrene, $C_1$ to $C_6$ alkyl styrenes, vinyl alkyl ethers wherein the alkyl portion has 1 to 6 carbon atoms, $C_3$–$C_{12}$ perfluoroalkyl ethyl thiocarbonylaminoethyl acrylates and methacrylates, $C_3$–$C_{12}$ fluoroalkyl acrylates and methacrylates, acryloxy and methacryloxy alkyl siloxanes, N-vinyl carbazole, $C_1$–$C_{12}$ alkyl esters of maleic, fumaric, itaconic, and mesaconic acids and the like. Examples of suitable hydrophobic monomers include methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, vinyl acetate, vinyl propionate, vinyl butyrate, vinyl valerate, styrene, chloroprene, vinyl chloride, vinylidine chloride, acrylonitrile, 1-butene, butadiene, methacrylonitrile, vinyl toluene, vinyl ethyl ether, perfluorohexylethylthiocarbonylaminoethyl methacrylate, isobornyl methacrylate, hexafluorobutyl methacrylate, 3-methacryloxypropylpentamethyldisiloxane, and bis(-methacryloxypropyl) tetramethyldisiloxane.

Suitable hydrophilic monomers include, without limitation, hydroxy substituted lower alkyl acrylates and methacrylates, acrylamide, methacrylamide, $C_1$–$C_2$ lower alkyl acrylamide and methacrylamide, ethoxylated acrylates and methacrylates, hydroxy substituted lower alkyl acrylamide and methacrylamide, hydroxy substituted lower alkyl vinyl ethers, sodium ethylene sulfonate, sodium styrene sulfonate, 2-acrylamido-2-methylpropanesulfonic acid, N-vinylpyrrole, N-vinylsuccinimide, N-vinyl pyrrolidone, 2- and 4-vinyl pyridine, acrylic acid, methacrylic acid, amino (by amino including quaternary ammonium), -monoloweralkylamino- or diloweralkylamino-lower alkyl acrylates or methacrylates, allyl alcohol, and the like.

Specific hydrophilic monomers include hydroxyethyl methacrylate, hydroxyethyl acrylate, acrylamide, methacrylamide, dimethylacrylamide, allyl alcohol, vinyl pyridine, vinyl pyrrolidone, glycerol methacrylate, N-(1,1-dimethyl-3-oxobutyl) acrylamide, and the like.

Preferred hydrophobic monomers are methyl methacrylate and vinyl acetate.

Preferred hydrophilic monomers are 2-hydroxyethyl methacrylate, N-vinyl pyrrolidone, and acrylamide.

Optionally, an additional conventional polyreactive crosslinking agent may be added, such as, allyl compounds e.g. allyl methacrylate, diallyl itaconate, monoallyl itaconate, diallyl maleate, diallyl fumarate, diallyl succinate, diallyl phthalate, triallyl cyanurate, triallyl isocyanurate, diethylene glycol bis-allyl carbonate, triallyl phosphate, triallyl trimellitate, allyl ether, N,N-diallylmelamine; vinyl compounds, e.g. divinyl benzene, N,N'-methylene bis acrylamide, ethylene glycol dimethacrylate, neopentyglycol dimethacrylate, tetraethylene glycol dimethacrylate, hexamethylene bis maleimide, divinyl urea, bisphenol A bis methacrylate, divinyl adipate, glycerin trimethacrylate, trimethylolpropane triacrylate, trivinyl trimellitate, 1,5-pentadiene, 1,3-bis(4-methacryloxybutyl) tetramethyl disiloxane, divinyl ether and divinyl sulfone; hydroxyl reactive compounds such as: polyvalent isocyanates e.g. hexamethylene diisocyanate, isophorone diisocyanate, toluene diisocyanate; polyaldehydes e.g. glutaraldehyde and glyoxal; polyacids e.g. glutaric acid and oxalic acid; polyepoxides e.g. butane diepoxide, vinylcyclohexane dioxide and butanediol diglycidyl ether; polyols (acid catalysis) e.g. dimethylol urea and diethylene glycol.

When employed, about 0.01 to 10 weight percent of crosslinking agent, based upon the weight of formula I derivative, may be present, preferably about 0.01 to about 5 percent, most preferably about 0.05 to 2 weight percent.

The resultant contact lenses are optically clear, strong, flexible, highly oxygen permeable and wettable. Further, the instant lenses are characterized by their ease of manufacture.

In the following examples, all parts are by weight unless otherwise described.

The following example illustrates a range of water contents obtained using different levels of isocyanatoethyl methacrylate (IEM) and the comonomers methyl methacrylate (MMA) and vinyl acetate (VA) with a polyvinyl alcohol (PVA) of weight average molecular weight (MW) of ~26,000.

3 g Air Products Vinol® 107 (MW=22–31,000, 98–98.8% hydrolyzed) PVA is dissolved in 27 g Aldrich Gold Label (99.9%) DMSO under house nitrogen at 60° C. (approximately 0.5 hour) in a three neck round bottom flask with overhead stirring. The solution is allowed to cool to room temperature (RT) (approximately 1 hr.). Then 2.6 (0.25 ml) 3.6 (0.35 ml), 5.2 (0.5 ml), 6.2 (0.6 ml), or 10.4 (1 ml) mole % (with respect to vinyl alcohol), Dow Chemical Developmental Monomer, isocyanatoethyl methacrylate (IEM), is added dropwise over 1.5 minutes and reacted at RT for 1 hour with vigorous stirring.

A given amount of IEM reacted PVA is combined with comonomer (MMA or VA) and initiator (1-hydroxycyclohexylphenyl ketone), mixed well, poured into flat "sandwich" molds and polymerized with UV light (360 nm) at room temperature for 1 hour. Control samples are made in a similar manner but without the addition of comonomer. In Example 1, PVA and monomer are listed as a weight percent of PVA plus monomers. The initiator is listed as a percent of the total reaction solution.

The polymerized films are removed from the molds and extracted successively in 50%, 25%, 0% DMSO/water solutions. They are extracted several times in $H_2O$ and boiled for 10 minutes before % $H_2O$ content is determined.

Diameters are measured on disks cut from films before extraction and after boiling.

EXAMPLE 1

PVA = Air Products Vinol ® 107

22–31,000 MW/98–98.8% Hydrolyzed

| Sample # | Mole % IEM | % PVA | % Monomer | % Initiator | % $H_2O$ | % Diameter Change (Initial to Boiled) |
|---|---|---|---|---|---|---|
| 1 Control | 2.6 | 100 | 0 | 0.05 | 85.14 | −12.0 |
| 2 | ↓ | 89.7 | 10.3 MMA | 0.04 | 78.82 | −16.9 |
| 3 | ↓ | 79.3 | 20.7 MMA | 0.03 | 75.88 | −19.7 |
| 4 Control | 3.6 | 100 | 0 | 0.03 | 83.63 | −13.0 |
| 5 | ↓ | 90.7 | 9.3 VA | 0.04 | 79.49 | −18.1 |
| 6 | ↓ | 89.5 | 10.5 MMA | 0.04 | 78.74 | −20.6 |
| 7 Control | 5.2 | 100 | 0 | 0.03 | 79.32 | −17.3 |
| 8 | ↓ | 88.9 | 11.1 VA | 0.03 | 75.60 | −18.1 |
| 9 | ↓ | 89.3 | 10.7 MMA | 0.03 | 74.41 | −21.7 |
| 10 | ↓ | 79.8 | 20.2 MMA | 0.03 | 68.67 | −24.8 |
| 11 Control | 6.2 | 100 | 0 | 0.03 | 76.20 | −19.4 |
| 12 | ↓ | 90.2 | 9.8 VA | 0.04 | 73.49 | −17.8 |
| 13 | ↓ | 88.7 | 11.3 MMA | 0.03 | 70.37 | −23.6 |
| 14 | ↓ | 78.5 | 21.5 MMA | 0.03 | 64.72 | — |
| 15 | ↓ | 65.6 | 34.4 MMA | 0.04 | 55.70 | — |
| 16 | 10.4 | 91.2 | 8.8 VA | 0.03 | 75.36 | — |
| 17 Control | ↓ | 100 | 0 | 0.04 | 74.80 | — |
| 18 | ↓ | 88.8 | 11.2 VA | 0.03 | 69.35 | −20.4 |
| 19 | ↓ | 89.7 | 10.3 MMA | 0.03 | 67.21 | −24.4 −24.5 |
| 20 | ↓ | 83.4 | 16.6 MMA | 0.05 | 66.98 | — |
| 21 | ↓ | 75.6 | 24.4 VA | 0.03 | 66.73 | — |
| 22 | ↓ | 52.3 | 47.7 VA | 0.03 | 60.47 | −23.3 |
| 23 | ↓ | 76.0 | 24.0 MMA | 0.04 | 58.08 | −29.6 |
| 24 | ↓ | 65.0 | 35.0 MMA | 0.03 | 54.72 | — |
| 25 | ↓ | 54.5 | 45.5 MMA | 0.03 | 43.81 | −31.4 |

As shown above in the control samples (i.e. no additional monomer), with increasing IEM concentration, the water content of films steadily decreases from ~85% (2.6 mole % IEM) to ~75% (10.4 mole % IEM). Also as the corresponding water content decreases the diameter changes become larger.

As the proportion of added monomer is increased, the corresponding water content decreases and diameter changes become larger (e.g. samples 7 and 10).

The following example shows the wide range in water content achieved using a PVA, weight average molecular weight (MW) = 86,000 (100% hydrolyzed) modified with different levels of isocyanatoethyl methacrylate (IEM) and polymerized with different levels of methyl methacrylate (MMA) and vinyl acetate (VA). Films are made as in Example 1 except that 3 g of Scientific Polymer Products 86,000 MW PVA is dissolved in 37 g DMSO and IEM is diluted with DMSO before addition.

EXAMPLE 2

PVA = Scientific Polymer Products 86,000 MW/100% Hydrolyzed

| Sample # | Mole % IEM | % PVA | % Monomer | % Initiator | % $H_2O$ Content | % Diameter Change (Initial to Boiled) |
|---|---|---|---|---|---|---|
| 1 Control | 2.6 | 100 | 0 | 0.03 | 84.33 | −19.1 |
| 2 | 2.6 | 85.8 | 14.2 VA | 0.02 | 80.00 | −22.5 |
| 3 | 2.6 | 87.6 | 12.4 MMA | 0.04 | 78.34 | −24.6 |
| 4 Control | 10.4 | 100 | 0 | 0.03 | 74.57 | −21.5 |
| 5 | 10.4 | 87.2 | 12.8 MMA | 0.07 | 73.50 | — |
| 6 | 10.4 | 85.2 | 14.8 VA | 0.03 | 71.83 | −20.7 |
| 7 | 10.4 | 88.4 | 11.6 VA | 0.03 | 69.96 | — |
| 8 | 10.4 | 84.4 | 15.6 MMA | 0.04 | 67.63 | −29.1 |
| 9 | 10.4 | 43.5 | 56.5 MMA | 0.03 | 39.23 | −37.5 |

As shown above, by adding additional monomer the water content decreases from ~80% (Sample 2) to ~39% (Sample 9) with a corresponding % diameter change of −22.5 and −37.5. Tensile properties of films made from this PVA are highly dependent on % IEM incorporation. At low (2.6%) IEM the films are elastic and weak but at high (10.4%) IEM incorporation the films are brittle and weak.

The following example shows the effect of partially hydrolyzed PVA and added comonomers on the copolymer product. Films are made as in Example 1 except that Vinol ® 205 (87–89% hydrolyzed) of weight average molecular weight (MW) 23–31,000 is used.

EXAMPLE 3

PVA = Air Products Vinol ® 205

22–31,000 MW/87–89% Hydrolyzed

| Sample # | Mole % IEM | % PVA | % Monomer | % Initiator | % $H_2O$ Content | % Diameter Change (Initial to Boiled) |
|---|---|---|---|---|---|---|
| 1 Control | 10.4 | 100 | 0 | 0.04 | 71.94 | −22.4 |
| 2 | ↓ | 90.0 | 10.0 VA | 0.03 | 68.39 | −18.3 |
| 3 | ↓ | 90.0 | 10.0 MMA | 0.04 | 65.90 | −26.3 |

VA = vinyl acetate
MMA = methyl methacrylate

On comparing the above table with Example 1 it can be seen that lowering the percent hydrolysis has little if any effect on water content and % contraction from the mold to the fully swollen state. There is no difference in the mixing (related to a lower PVA solution viscosity) of this lesser hydrolyzed compared to the fully hydrolyzed PVA of the same molecular weight.

The following example illustrates the effect of long term heating on a PVA copolymer film. The film is made as in Example 1. Tensile testing is done on an Instron. A polymerized hydroxyethyl methacrylate (pHEMA) film containing 1% ethylene glycol dimethacrylate (EGDMA) is used as a comparison sample.

EXAMPLE 4

| Composition | % H$_2$O | Treatment | Tensile Data Breaking Strength (kg/cm$^2$) | % Elongation | Young's Modulus (kg/cm$^2$) |
|---|---|---|---|---|---|
| 6.2 mole % IEM, 64.9% PVA, 35.1% MMA, 0.03% Initiator | ~56 | Equilibrated in saline | 14.3 | 50 | 34 |
| ↓ | — | Heated in saline Boiled, 2 hours then 92°, 70 hours | 18.3 | 48 | 44 |
| pHEMA (1% EGDMA) | 37 | None | 3.5 | 48 | 13 |

IEM = isocyanatoethyl methacrylate; MMA = methyl methacrylate

As illustrated above, subjecting the PVA-IEM-MMA film to the above heat treatment increases its tensile strength with a slight decrease in its % elongation. The film has a tensile strength 5 to 6 times that of a pHEMA film.

The following example shows the effect of increasing vinyl acetate content at several different levels of isocyanatoethyl methacrylate (IEM) modification. Films are made according to Example 1 using Scientific Polymer Products weight average molecular weight (MW) 14,000 (100% hydrolyzed) PVA and are modified 2.6, 10.4, 12.4 or 20.7 mole % with IEM.

The tensile strength of 1"×3" strips cut from films are measured on a Visco-Tech apparatus. The Visco-Tech, composed of a moving stage and solitary spring and meter is similar to an Instron, typically used for tensile testing, however a much smaller force can be accurately measured on the Visco-Tech. To obtain stress-strain points between zero stress-strain and that at break, a strip of paper is set up so that at various forces, e.g. 25 g, 50 g, a small drop of ink is dropped on this strip recording the corresponding elongation.

EXAMPLE 5

| Mole % IEM | % PVA | % Vinyl Acetate | % Initiator | % H$_2$O Content | % Elongation | Tensile Stress psi | kg/cm$^2$ |
|---|---|---|---|---|---|---|---|
| 2.6 | 92.7 | 7.3 | 0.025 | 84.2 | 75.0 | 17.2 | 1.21 |
| ↓ | 85.7 | 14.3 | 0.052 | 83.0 | 116.7 | 25.3 | 1.78 |
| ↓ | 80.2 | 19.8 | 0.076 | 81.9 | 91.7 | 21.7 | 1.53 |
| ↓ | 72.8 | 27.2 | 0.12 | 80.0 | 108.3 | 22.5 | 1.58 |
| ↓ | 71.3 | 28.7 | 0.12 | 79.7 | 83.3 | 16.4 | 1.15 |
| 10.4 | 92.8 | 7.2 | 0.02 | 70.9 | 75.0 | 51.5 | 3.62 |
| ↓ | 86.4 | 13.6 | 0.03 | 69.6 | 58.3 | 34.4 | 2.42 |
| ↓ | 79.8 | 20.2 | 0.06 | 68.1 | 83.3 | 52.4 | 3.68 |
| ↓ | 68.8 | 31.2 | 0.11 | 65.4 | — | — | — |
| 12.4 | 92.1 | 7.9 | 0.0096 | 69.3 | 50.0 | 41.6 | 2.92 |
| ↓ | 85.0 | 15.0 | 0.021 | 68.3 | 58.3 | 42.3 | 2.97 |
| ↓ | 77.9 | 22.1 | 0.034 | 66.7 | 83.3 | 43.7 | 3.07 |
| ↓ | 71.4 | 28.6 | 0.047 | 65.4 | 75.0 | 46.8 | 3.29 |
| ↓ | 68.0 | 32.0 | 0.054 | 64.7 | 58.3 | 42.2 | 2.97 |
| 20.7 | 100 | 0 | 0.03 | 60.7 | 83.3 | 14.26 | 1.00 |
| ↓ | Control | | | | | | |
| ↓ | 93.0 | 7.0 | 0.03 | 59.8 | — | >16.3 | >1.10 |

In general, as the % IEM is increased the water content drops and as the amount of comonomer vinyl acetate is increased, at any particular level of IEM, the water content also drops, approximately 4% for every 10% modification with vinyl acetate. If one compares 2.6 to 10.4 mole % IEM, accompanying the decrease in water content, the tensile stress roughly doubles and the % elongation decreases by approximately 20%.

The following example compares three comonomers which differ in their degree of hydrophobicity: vinyl acetate (VA), methyl methacrylate (MMA) and a perfluoromethacrylate, PFM ($C_6F_{13}$—$C_2H_4$—SCONH—$C_2H_4$—OCO—$C(CH_3)$=$CH_2$). Films are made according to the procedure in Example 1, except that Scientific Polymer Products weight average molecular weight (MW) 14,000 (100% hydrolyzed) PVA is used.

EXAMPLE 6

Isocyanatoethyl methacrylate = 10.4 mole %

| | % PVA | % Monomer | % Initiator | % H$_2$O Content |
|---|---|---|---|---|
| Control | 100.0 | 0 | 0.03 | 75.1 |
| | 93.4 | 6.6 VA | 0.03 | 72.3 |
| | 85.9 | 14.1 VA | 0.02 | 72.3 |
| | 78.7 | 21.3 VA | 0.03 | 71.3 |
| | 73.1 | 26.9 VA | 0.04 | 69.6 |
| | 68.3 | 31.7 VA | 0.05 | 67.6 |
| | 60.2 | 39.8 VA | 0.03 | 62.5 |
| | 34.6 | 65.4 VA | 0.04 | 52.7 |
| | 93.0 | 7.0 MMA | 0.03 | 70.1 |
| | 80.6 | 19.4 MMA | 0.06 | 61.5 |
| | 73.0 | 27.0 MMA | 0.03 | 55.9 |
| | 57.6 | 42.4 MMA | 0.04 | 49.0 |
| | 92.4 | 7.6 PFM | 0.04 | 67.5 |
| | 85.1 | 14.9 PFM | 0.06 | 63.8 |
| | 81.5 | 18.5 PFM | 0.06 | 62.7 |
| | 72.9 | 27.1 PFM | 0.04 | 60.2 |
| | 57.5 | 42.5 PFM | 0.04 | 55.4 |

As indicated above, these three compositions show a decrease in water content with increase in monomer content with the MMA containing compositions demonstrating the most dramatic decrease, being extremely hydrophobic, and vinyl acetate the least dramatic decrease, being the least hydrophobic. Monomer hydrophobicity is only part of the explanation for the water content, the amount actually incorporated being another factor.

The following example shows that optically clear materials of good mechanical strength can be made with combinations of hydroxyethyl methacrylate (HEMA) a hydrophilic monomer, and vinyl acetate (VA) with or without the additional crosslinker ethylene glycol dimethacrylate (EGDMA). Films are made according to Example 6. Tensile testing is done as in Example 5.

EXAMPLE 7

Isocyanatoethyl methacrylate=6.2 mole %

| Weight Percent Reactant | | | | | | Tensile | | |
|---|---|---|---|---|---|---|---|---|
| PVA | Vinyl Acetate | HEMA | EGDMA | % Initiator | % $H_2O$ Content | Breaking $kg/cm^2$ | Strength psi | Elongation % |
| 86.3 | 5.1 | 8.5 | 0 | 0.14 | 81.8 | 1.79 | 25.5 | 97 |
| 85.7 | 9.9 | 4.4 | 0 | 0.10 | 79.7 | 1.11 | 15.7 | 45 |
| 84.6 | 8.5 | 5.6 | 1.3 | 0.096 | 81.4 | 0.98 | 14.6 | 50 |
| 84.7 | 5.2 | 8.7 | 1.4 | 0.10 | 80.5 | 1.89 | 26.9 | 112 |
| 83.5 | 6.3 | 8.0 | 2.2 | 0.10 | 81.2 | 1.24 | 17.7 | 67 |
| 81.4 | 8.8 | 6.7 | 3.1 | 0.19 | 80.7 | 1.78 | 25.2 | 146 |

As shown above, all these compositions have ~81% water content. Considering their level of water content they have good mechanical strength coupled with good % elongation.

The following example shows the dimensional expansion and contraction of a 56% water content disk in 3% buffered $H_2O_2$ simulated lens disinfection solution. Disks cut from sheets made according to the procedure in Example 1 (0.03% initiator) contain 6.2 mole % isocyanatoethyl methacrylate (IEM), 64.9% PVA and 35.1% methyl methacrylate (MMA). After extraction and water swelling the sheets are equilibrated in phosphate buffered saline, pH 7.4 (0.8% NaCl, 0.17% $Na_2HPO_4.7H_2O$, 0.02% KCl, 0.02% $KH_2PO_4$ (w/v in 100 ml $H_2O$)). Disks (0.25 mm thick) cut from the sheets and initial diameters read are then subsequently treated in 3% $H_2O_2$ buffered saline, pH 7.1 (10 ml 30% $H_2O_2$ (aq.)+90 ml buffered saline). Following the peroxide treatment the disks are soaked in buffered saline containing 4% $Na_2S_2O_5$ for 1 minute (to quench the peroxide) and then transferred to buffered saline.

EXAMPLE 8

| | |
|---|---|
| Initial Diameter in buffered saline | 14.72 ± 0.02 mm |
| Diameter after equilibration in $H_2O_2$ | 14.82 ± 0.01 |
| Equilibration time in $H_2O_2$ | 10 min. |
| Diameter in saline after | |
| 3 min. | 14.69 ± 0.03 |
| 7 min. | 14.68 ± 0.05 |
| 10 min. | 14.70 ± 0.07 |
| 15 min. | 14.66 ± 0.04 |
| 20 min. | 14.67 ± 0.03 |
| 30 min. | 14.67 ± 0.01 |
| 60 min. | 14.73 ± 0.04 |
| 3 hours | 14.70 ± 0.07 |

After a 10 minute soak in buffered 3% $H_2O_2$ a disk swells 0.7% and retracts to its original size after 3 minutes in buffered saline.

The following example shows the Shore-A (wet) hardness of some samples of ~58% water content and their corresponding dimensional contraction.

Shore-A (wet) hardness testing is performed on a stack of 4 to 5 rectangular sheets (~0.7 mm thick). Films containing the comonomers methyl methacrylate (MMA), ethylhexyl acrylate (EHA) or isobornyl methacrylate (IBMA) and 6.3 mole % isocyanatoethyl methacrylate (IEM) are made according to the procedure given in Example 1. Due to their hydrophobicity, the IBMA and EHA monomers cannot be dissolved in the PVA solution at a concentration greater than ~26%. A polymerized hydroxyethyl methacrylate (pHEMA) film containing 1% ethylene glycol dimethacrylate (EGDMA) is used as a comparison sample.

EXAMPLE 9

| Mole % IEM | % PVA | % Monomer | % Initiator | % $H_2O$ Content | % Diameter Change | Shore-A (wet) Hardness |
|---|---|---|---|---|---|---|
| 6.2 | 76.0 | 24.0% EHA | 0.03 | 59.96 | −29.71 | 49 |
| 6.2 | 74.6 | 25.4% IBMA | 0.03 | 58.63 | −27.27 | 65 |
| 6.2 | 64.9 | 35.1% MMA | 0.03 | 57.18 | −30.89 | 63 |
| 6.2 | 64.9 | 35.1% MMA Boiled 36 hr. in saline | 0.03 | — | — | 65 |
| pHEMA (in saline) | | | — | 36.49 | — | 40 |

As shown above, the wet hardness ranges from 63–65 for 35.1% MMA or 25.4% IBMA containing compositions, but was softer (49), for the 24.0% EHA containing film. By this measurement technique a 37% water content pHEMA film has a wet hardness of 40.

The following example compares the properties of some 56–62% water content films containing methyl methacrylate (MMA) and 2-ethylhexyl acrylate (EHA).

Films are made according to Example 1, except that benzoin methyl ether (BME) is used as the initiator replacing 1-hydroxycyclohexylphenyl ketone. It is found that BME catalysis behaves differently in EHA and MMA containing systems—two to three times more BME than 1-hydroxycyclohexylphenyl ketone is needed to achieve a similar product in the EHA polymerization whereas no increase in catalyst is needed for the MMA containing system.

EXAMPLE 10

Isocyanatoethyl methacrylate=6.2 mole %

| Sample # | % PVA | % Monomer | % BME | % $H_2O$ Content | % Diameter Change Initial to Boiled | Tensile (Saline) | | | Shore-A (Wet) Hardness ($H_2O$ Swollen) |
|---|---|---|---|---|---|---|---|---|---|
| | | | | | | Young's Modulus $10^5$ dyne/$cm^2$ | Stress at Break $10^5$ dyne/$cm^2$ | % Elongation | |
| 1 | 72.4 | 27.6 MMA | 0.03 | 61.31 | −26.45 | 213 ± 5 | 81 ± 13 | 43.3 | 48 |
| 2 | 72.5 | 27.5 MMA | 0.04 | 62.64 | −26.57 | 156 ± 10 (15.9 kg/$cm^2$) | 76 ± 9 (7.7 kg/$cm^2$) | 58 ± 8 | 38 |
| 3 | 72.7 | 27.3 MMA | 0.04 | 61.56 | −29.24 | 175 ± 17 | 71 ± 14 | 47 ± 8 | 43 |
| 4 | 75.0 | 25.0 EHA | 0.10 | 56.28 | −30.90 | 173 ± 21 (17.6 kg/$cm^2$) | 62 ± 17 (6.3 kg/$cm^2$) | 48 ± 20 | 43 |

-continued

| Sample # | % PVA | % Monomer | % BME | % H$_2$O Content | % Diameter Change Initial to Boiled | Tensile (Saline) Young's Modulus 10$^5$ dyne/cm$^2$ | Stress at Break 10$^5$ dyne/cm$^2$ | % Elongation | Shore-A (Wet) Hardness (H$_2$O Swollen) |
|---|---|---|---|---|---|---|---|---|---|
| 5 | 79.6 | 20.4 EHA | 0.08 | 59.13 | −30.12 | 178 ± 5 | 62 ± 9 | 42 ± 7 | 54 |
| 6 Control | 64.9 | 35.1 MMA | 0.03* | 56 | — | 34 kg/cm$^2$ | 14.3 kg/cm$^2$ | 50 | — |

1 kg/mm$^2$ = 981 × 10$^5$ dyne/cm$^2$
*1-hydroxycyclohexylphenyl ketone

As shown above, i.e. samples 1–5, similar mechanical properties are observed when MMA is replaced by EHA. A 56% water content EHA containing film (Sample 4) has a similar % elongation (48) as a 56% water content MMA containing control film, sample 6 (50)—however the stress at break and the modulus are reduced by half.

Raising the water content of a 6.2 mole % IEM, MMA film from 56 (Sample 6) to 62% (Sample 2) by decreasing the MMA contained in the film leads to a slight increase in % elongation with the stress at break and modulus halved.

EXAMPLE 11

Several prototype lenses are fabricated in contact lens molds (TPX) made from poly(α-methyl pentene). The reaction solution is made as in Example 1 with 6.2 mole % isocyanatoethyl methacrylate, 34.0% MMA and 0.06% benzoin methyl ether (initiator). The solution is pipetted into the lens molds and UV cured for 1 hour. The lenses come out optically clear with no obvious difference in strength or swelling relative to a sheet made of similar composition.

In the following example the effect of an added DMSO stabilizer, triethanolamine (TEA), on some film properties is tested. Films are made both in the presence (~0.45%) and absence of TEA according to Example 1 with 6.2 (0.6 ml) or 5.7 (0.55 ml) mole % isocyanatoethyl methacrylate (IEM) using benzoin methyl ether (BME) as the initiator.

EXAMPLE 12

| Mole % IEM | % PVA | % MMA | % BME | % TEA* | % H$_2$O | % Diameter Change (Initial to Boiled) |
|---|---|---|---|---|---|---|
| 6.2 | 72.5 | 27.5 | 0.04 | 0 | 62.64 | −26.6 |
| 6.2 | 72.5 | 27.5 | 0.04 | 0.45 | 60.87 | −27.0 |
| 5.7 | 69.9 | 30.1 | 0.04 | 0 | 59.51 | −28.5 |
| 5.7 | 69.7 | 30.3 | 0.04 | 0.44 | 62.44 | −27.2 |

*% of total weight of reaction mixture

As shown above TEA has little or no effect on the percent contraction of the film from the mold after water swelling or its water content.

The following example illustrates the effect of initial reactant concentration on various physical properties of the resultant water equilibrated film.

PVA solutions are made according to Example 1. To 30 g of a 10% PVA solution (Air Products Vinol ® 107), 4.825 ml of isocyanatoethyl methacrylate (IEM) is added dropwise under nitrogen with rapid stirring. Then 0.49 g of methyl methacrylate (MMA) and 0.007 g of initiator, benzoin methyl ether (BME), is added to the PVA-IEM solution (Sample #1). Two other samples (2 and 3) are made in a similar manner but to which additional DMSO is added diluting the reactants to the values indicated in the table. The initiator level is based on the total weight of reactants and the % BME in the table is the value calculated based on the weight of solution. The films are polymerized and equilibrated as in Example 1.

EXAMPLE 13

PVA = Air Products Vinol ® 107

22–31,000 MW/98–98.8% Hydrolyzed

Isocyanatoethyl Methacrylate = 50 mole %

| Sample # | % PVA | % MMA | % BME | % Reactants in Reaction Mixture | % H$_2$O | % Diameter Change (Initial to Boiled) | Tensile (Saline) Young's Modulus 10$^5$ dyne/cm$^2$ | Stress at Break 10$^5$ dyne/cm$^2$ | % Elongation | Shore A (wet) Hardness |
|---|---|---|---|---|---|---|---|---|---|---|
| 1 | 72.5 | 27.5 | 0.04 | 25.91 | 34.73 | −26.8 | 13040 | 485 | 16 | 92 |
| 2 | 72.7 | 27.3 | 0.03 | 15.72 | 37.57 | −39.2 | 9909 | 353 | 70 | 90 |
| 3 | 72.3 | 27.7 | 0.02 | 9.31 | 43.61 | −47.8 | — | — | — | 60 |

MMA = methyl methacrylate,
BME = benzoin methyl ether
1 kg/mm$^2$ = 981 × 10$^5$ dyne/cm$^2$ As shown above, when the initial reaction mixture is more dilute, the final water equilibrated film has higher water content, lower tensile strength and Shore A (wet) hardness, and greater % elongation. Also with increased reactant dilution the % diameter change on going from the mold to the final water equilibrated state increases.

The following example is a listing of PVA films made in a similar manner to that in Example 1 and containing various hydrophobic comonomers. Use of a high level of bis(methacryloxypropyl)tetramethyldisiloxane makes probable its functioning both as a monomer and crosslinking agent.

EXAMPLE 14

PVA=Air Products Vinol ® 107

22-31,000 MW/98-98.8% Hydrolyzed

Isocyanatoethyl methacrylate=6.2 mole %

| Sample # | % PVA | % Monomer | % BME | % H₂O | % Diameter Change (Initial to Boiled) |
|---|---|---|---|---|---|
| 1 | 82 | 18 Styrene | 0.08 | 78.08 | −18.16 |
| 2 | 69 | 31 HFBMA | 0.09 | 55.38 | −31.72 |
| 3 | 73 | 27 MPDS | 0.06 | 61.19 | −24.87 |
| 4 | 84 | 16 BMTDS | 0.05 | 68.03 | −27.03 |
| 5 Control | 100 | — | 0.06 | 80.77 | — |
| 6 Control | 100 | — | 0.03* | 76.20 | −19.4 |

*1-hydroxycyclohexylphenyl ketone
HFBMA = hexafluorobutyl methacrylate
MPDS = 3-methacryloxypropylpentamethyldisiloxane
BMTDS = bis(methacryloxypropyl)tetramethyldisiloxane All films are strong, clear and colorless. Except for styrene (Sample #1), the monomers used decrease the final film water content and increase the % diameter change on going from the mold to the final equilibrated state compared to the controls.

The following example is a listing of PVA films made in a similar manner to that in Example 1, containing a mixture of various hydrophobic and hydrophilic comonomers. These mixtures are chosen so that the final content is in the range 50-60%.

EXAMPLE 15

PVA=Air Products Vinol ® 107

22-31,000 MW/98-98.8% Hydrolyzed

Isocyanatoethyl methacrylate=10.4 mole %

| Sample # | % PVA | % Monomer Hydrophilic | Hydrophobic | % Initiator (BME) | % H₂O | % Diameter Change (Initial to Boiled) |
|---|---|---|---|---|---|---|
| 1 | 74.2 | 5.4 NVP | 20.4 IBMA | 0.08 | 50.16 | −31.8 |
| 2 | 71.7 | 5.6 AA | 22.7 IBMA | 0.07 | 48.80 | −31.3 |
| 3 | 70.2 | 4.8 AA | 25.0 MMA | 0.04 | 56.84 | −28.4 |
| 4 | 69.9 | 4.6 NVP | 25.5 MMA | 0.03 | 57.34 | −29.2 |
| 5 | 77.1 | 4.3 NVP | 18.6 MMA | 0.04 | 58.30 | −27.8 |
| 6 | 74.2 | 4.6 HEMA | 21.2 MMA | 0.04 | 56.74 | −28.2 |

NVP = N—vinyl pyrrolidone, AA = acrylamide, HEMA = 2-hydroxyethyl methacrylate,
IBMA = isobornyl methacrylate, MMA = methyl methacrylate,
BME = benzoin methyl ether All of the above films are clear, colorless and strong.

EXAMPLE 16

This example illustrates the effect of high isocyanatoethyl methacrylate (IEM) content and added comonomer on various physical properties of films. PVA solutions are made according to Example 1 with PVA solution concentrations as listed in the following table. IEM is added dropwise under nitrogen and % IEM content by weight can be determined from the table. Sheets are polymerized with monomer (controls do not have monomer) as in Example 1 with benzoin methyl ether (initiator) as indicated in the table below. Both 90 and 95 mole % IEM-PVA solutions contain unreacted isocyanate as indicated by I. R. spectroscopy.

PVA-IEM Hydrogel: High IEM Content using VINOL ® 107

| Sample # | Wt. % PVA in DMSO | Mole % IEM | Wt. % PVA + IEM in DMSO | % PVA | % Monomer | % BME | % H₂O Content | % Diameter Change (Initial to Boiled) | Observation (0.3 mm thick sheets) |
|---|---|---|---|---|---|---|---|---|---|
| 1 | 10.0 | 30 | 18.6 | 67 | 33 DMA | 0.04 | 54.94 | −16.02 | clear, cracked on bending* |
| 2 | ↓ | ↓ | ↓ | 67 | 33 NVP | 0.04 | 52.55 | −13.12 | clear, cracked on bending* |
| 3 | ↓ | ↓ | ↓ | 68 | 32 AA | 0.04 | 53.43 | −15.92 | clear, cracked on bending two times* |
| 4 Control | ↓ | ↓ | ↓ | 100 | — | 0.04 | 43.07 | | clear, did not crack on bending |
| 5 | 10.0 | 50 | 23.5 | 76 | 24 DMA | 0.05 | 45.92 | −19.47 | clear, cracked on bending* |
| 6 | ↓ | ↓ | ↓ | 66 | 34 DMA | 0.04 | 50.07 | −15.92 | ↓ |
| 7 | ↓ | ↓ | ↓ | 76 | 24 NVP | 0.04 | 48.55 | −14.90 | ↓ |
| 8 | ↓ | ↓ | ↓ | 76 | 24 AA | 0.04 | 46.59 | −16.57 | ↓ |
| 9 | ↓ | ↓ | 21.9 | 39 | 61 AA | 0.06 | 56.93 | −10.66 | ↓ |
| 10 | ↓ | ↓ | 23.5 | 76.7 | 23.3 HEMA | 0.07 | 37.36 | −26.0 | clear, bent twice without cracking* |
| 11 | ↓ | ↓ | ↓ | 79.9 | 20.1 MMA | 0.05 | 34.01 | −27.7 | clear, bent twice without cracking* |
| 12 Control | ↓ | ↓ | ↓ | 100.0 | — | 0.08 | 37.06 | −27.4 | clear, cracked on bending* |
| 13 Control | ↓ | ↓ | 21.9 | 100.0 | — | 0.04 | 38.07 | | clear, did not crack on bending |
| 14 | 7.5 | 75 | 22.8 | 79.1 | 20.9 MMA | 0.05 | 33.38 | −28.5 | clear, cracked on bending* |
| 15 | ↓ | ↓ | ↓ | 77.5 | 22.5 HEMA | 0.05 | 34.73 | −28.4 | ↓ |
| 16 Control | ↓ | ↓ | ↓ | 100.0 | — | 0.05 | 33.67 | −29.0 | ↓ |
| 17 | 6.8 | 90 | 23.4 | 74.5 | 25.5 MMA | 0.07 | 40.05 | −23.8 | clear, cracked on bending** |
| 18 | ↓ | ↓ | ↓ | 74.4 | 25.6 HEMA | 0.05 | 36.87 | −26.2 | ↓ |
| 19 Control | ↓ | ↓ | ↓ | 100.0 | — | 0.05 | 43.57 | −24.3 | ↓ |
| 20 | 2.9 | 95 | 11.3 | 73.8 | 26.2 MMA | 0.07 | 59.84 | −27.4 | hazy, cracked on bending** |
| 21 | ↓ | ↓ | ↓ | 70.1 | 29.9 HEMA | 0.06 | 46.68 | −31.7 | ↓ |
| 22 Control | ↓ | ↓ | ↓ | 100.0 | — | 0.08 | 63.55 | −28.0 | ↓ |

*This composition when made into a thin (0.07 mm thick) sheet can be bent without cracking.
**This composition when made into a very thin (0.02 mm thick) sheet can be bent without cracking.
DMA = dimethylacrylamide, NVP = N—vinyl pyrrolidone, AA = acrylamide,
HEMA = 2-hydroxyethyl methacrylate, MMA = methyl methacrylate As shown above, clear, flexible films can be made using up to 95 mole % IEM. Wate content is also sensitive to the solid content in the reaction mixture. It should be noted that the water content for the HEMA containing film (at 90 or 95% IEM) is unexpectedly low. This can be due to additional cross-linking agent formed in situ by the reaction of HEMA and the remaining unreacted IEM.

EXAMPLE 17

Preparation of Reaction Product of 2,4 toluene diisocyanate with 2-hydroxyethyl methacrylate: (3-isocyanato-p-tolyl)carbamoyloxyethyl methacrylate (TDI-HEMA)

5.81 g (0.033 mole) 2,4 toluene diisocyanate (TDI) is dissolved in 5.04 g isopropyl acetate at room temperature and to this is added 2.18 g (0.017 moles) 2-hydroxyethyl methacrylate (HEMA) and the mixture stirred 16 hours at room temperature. A white precipitate appears during the reaction. The mixture is cooled to 5° and left standing for 16 hours. The precipitate is filtered, washed with cold toluene and hexane and dried yielding 2 g of crystalline product having a melting point of 69°–70° C. (U.S. Pat. No. 4,008,247, m. pt. 71°–72° C.). An I. R. of the compound in DMSO has a large isocyanate peak at 2270 $cm^{-1}$. NMR results suggest that 91 mole % (95 wt. %) of the product is the monoadduct of 2-hydroxyethyl methacrylate and 2,4 toluene diisocyanate (para to the methyl group).

EXAMPLE 18

0.41 g of reaction product of Example 17 is dissolved in 1 ml of dimethyl sulfoxide (Aldrich, Gold Label) and this solution added dropwise over a period of 1 minute to 15 ml of a rapidly stirring 10% Air Products Vinol ® 107/DMSO solution. The mixture is allowed to react at room temperature for 1 hour (complete disappearance of isocyanate IR band at 2270 $cm^{-1}$) and is designated as the stock solution. In sample 1, benzoin methyl ether (BME), 0.008 g, is dissolved in 2.6 g of the stock solution and the mixture poured into sandwich molds and irradiated (360 nm) for 1 hour. In sample 2, to 3.03 g of the stock solution is added 0.0745 g methyl methacrylate (MMA) and 0.0033 g BME and the mixture is then treated as in sample 1. Sample 3 is prepared in a similar manner to sample 2 (see table below). After polymerization samples of the films are measured, equilibrated in water, boiled for 10 minutes and then remeasured.

As shown above in samples 2 and 3, increasing the level of MMA lowers the water content, increases the % diameter change and increases the strength of the water equilibrated film over that of the control.

EXAMPLE 19

Preparation of Reaction Product of 2,4 toluene diisocyanate with t-butyl-aminoethyl methacrylate: [(3-isocyanato-p-tolyl)t-butylureido]ethyl methacrylate (TDI-tBAEM)

2.08 g (0.012 moles) 2,4 toluene diisocyanate (TDI) is dissolved in 5.04 g isopropyl acetate at room temperature. The solution is cooled in dry ice and 2.37 g (0.013 moles) t-butylaminoethyl methacrylate (tBAEM) is added dropwise in the cold mixture. The mixture is left 1.5 hr. in dry ice and slowly warmed to room temperature. A white precipitate is formed during this process. The mixture is cooled to −15° C. at which point the precipitate is filtered, washed with cold hexane and dried yielding 2.37 g of crystalline product having a melting point of 98°–99° C. An I.R. of the compound in chlorobenzene showed a large isocyanate peak at 2270 $cm^{-1}$. NMR results suggest that 90 mole %*(∼90 wt. %) of the product is the monoadduct of 2,4 toluene diisocyanate and t-butylaminoethyl methacrylate (para to the methyl group).

*Note: The other 10 mole % consists of a combination of monoadduct at the other site and diadduct.

EXAMPLE 20

In sample 1, 0.59 g of the reaction product of Example 19 is suspended in 2 ml of dimethyl sulfoxide (Aldrich, Gold Label) and this solution injected into 5 ml of rapidly stirring 10% Air Products Vinol ® 107/DMSO solution under nitrogen. The mixture is allowed to react at room temperature for 2 hours during which time the suspension turns to a clear solution. Benzoin methyl ether (BME), 0.008 g, is dissolved in 3.08 g of this solution and the mixture poured into sandwich molds and irradiated (360 mm) for 1 hour.

Sample 2 is prepared in a similar manner to sample 1 except 0.59 g of the reaction product of Example 19 is suspended in 2.5 g of dimethyl sulfoxide. After obtaining a clear solution with PVA, 3.0505 g of this stock solution is combined with 0.0755 g of methyl methacrylate and 0.0022 g of BME. Sample 3 is prepared in a similar manner to sample 2 (see table below). After polymerization samples of the films are measured, equilibrated in water, boiled for 10 minutes and then remeasured.

| Sample | Wt. % TDI-HEMA* Reaction Product | Mole % TDI-HEMA* to Alcohol Units | Wt. % PVA | Wt. % MMA | Wt. % DMSO | Wt. % BME | % $H_2O$ Content | % Diameter Change (Initial to Boiled) | Observation After Irradiation, Water Equilbration & Boiling |
|---|---|---|---|---|---|---|---|---|---|
| Control |  |  |  |  |  |  |  |  |  |
| 1 | 7.3 | 12.3 | 8.2 | 0 | 84.3 | 0.3 | 68.41 | — | Film: transparent pale yellow, moderate strength, flexible, elastic |
| 2 | 7.66 | 12.3 | 8.98 | 2.4 | 80.85 | 0.11 | 61.82 | −26.65 | Film: transparent pale yellow, strong, flexible, elastic |
| 3 | 7.82 | 12.3 | 8.72 | 4.92 | 78.45 | 0.09 | 54.36 | −28.60 | Film: transparent, pale yellow, strong, flexible, elastic |

*(3-isocyanato-p-tolyl)carbamoyloxyethyl methacrylate

| Sample | Wt. % TDI-tBAEM* Reaction Product | Mole % TDI-tBAEM* to Alcohol Units | Wt. % PVA | Wt. % MMA | Wt. % DMSO | Wt. % BME | % H₂O Content | % Diameter Change (Initial to Boiled) | Observation After Irradiation, Water Equilbration & Boiling |
|---|---|---|---|---|---|---|---|---|---|
| Control | | | | | | | | | |
| 1 | 6.48 | 13.0 | 7.77 | 0 | 85.49 | 0.26 | 50.92 | — | Film: transparent, pale yellow, fairly strong, flexible |
| 2 | 7.11 | 13.0 | 6.03 | 2.41 | 84.38 | 0.07 | 31.70 | −39.08 | Film: transparent, pale yellow, strong, flexible |
| 3 | 6.92 | 13.0 | 5.86 | 5.10 | 82.05 | 0.07 | 29.20 | −37.45 | Film: transparent, pale yellow, strong, flexible |

*[(3-isocyanato-p-tolyl)t-butylureido]ethyl methacrylate

As shown above in samples 2 and 3 increasing the level of MMA lowers the water content and increases the strength of the water equilibrated film over that of the control.

EXAMPLE 21

Preparation of Reaction Product of isophorone diisocyanate (IPDI) with 2-hydroxyethyl methacrylate: An isocyanatoisophoronylcarbamoyloxyethyl methacrylate (IPDI-HEMA)

A: 5.83 g (0.045 mole) 2-hydroxyethyl methacrylate (HEMA) is combined with 5.04 g (0.0227 mole) IPDI and stirred at room temperature for 65 hours. An isocyanate titration at this point shows 39% unreacted. The proton NMR data of the reaction mixture is consistent with the monoadduct formation approximately equally distributed at both isocyanates. Attack at the second site, i.e. diadduct formation, appears to be a slower process.

B: 5.81 g (0.045 mole) HEMA is combined with 5.01 g (0.0226 mole) IPDI and stirred at room temperature for 161 hours. An isocyanate titration at this point shows 43% unreacted.

EXAMPLE 22

For sample 1, 0.65 g of the isocyanatoisophoronylcarbamoyloxyethyl methacrylate (IPDI-HEMA) of Example 21(A) is slowly added to 5 g of a rapidly stirring 10% Vinol ® 107/DMSO solution at room temperature and allowed to react for 1 hour (complete disappearance of isocyanate IR band at 2270 cm⁻¹). To this solution is dissolved 0.026 g benzoin methyl ether (BME) and the solution poured into a sandwich mold and irradiated (360 nm) for 45 minutes at room temperature. For sample 2, 1.1996 g of the IPDI-HEMA of Example 21(B) is slowly added to 10 g of a rapidly stirring 10% Vinol ® 107/DMSO solution at room temperature and allowed to react for 1 hour. To 3.0268 g of this solution is added 0.07 g methyl methacrylate (MMA) and 0.004 g BME and the solution poured into a sandwich mold and irradiated for 1 hour at room temperature. Sample 3 is prepared in a similar manner to sample 2 (see table below). After polymerization samples of the films are measured, equilibrated in water, boiled for 10 minutes and then remeasured.

| Sample | Wt. % IPDI-HEMA Product | Mole %+ IPDI-HEMA Monoadduct to Alcohol Units | Wt. % PVA | Wt. % MMA | Wt. % DMSO | Wt. % BME | % H₂O Content | % Diameter Change (Initial to Boiled) | Observation After Irradiation, Water Equilbration & Boiling |
|---|---|---|---|---|---|---|---|---|---|
| Control | | | | | | | | | |
| 1 | 11.45 | 10.0 | 8.80 | 0 | 79.30 | 0.45 | 42.76 | — | Film: transparent, colorless, strong, flexible |
| 2 | 10.46 | 8.69 | 8.72 | 2.26 | 78.44 | 0.13 | 44.41 | −29.52 | Film: transparent colorless, strong, flexible |
| 3 | 10.12 | 8.69 | 8.44 | 5.38 | 75.95 | 0.12 | 39.27 | −29.62 | Film: transparent, colorless, strong, flexible |

+Assuming 60% of isocyanate groups reacted and diadduct formation slow i.e. 50% reaction corresponds to 100% monoadduct. One then has 40 mole %* HEMA, 40 mole %* monoadduct and 10 mole %* diadduct. Hence, the monoadduct is calculated to be presentas 58 wt. % of the reaction product i.e. 0.58 × 11.45 = 6.64 wt. %, and then, 100X (mole monoadduct/mole vinyl alcohol units) =

$$\left(\frac{6.64/8.8}{352/44}\right) \times 100 = 10 \text{ mole \% for sample 1.}$$

The values for samples 2 and 3 are calculated in a similar manner.
*Based on original moles of HEMA.

As shown above, in samples 2 and 3 increasing the level of MMA lowers the water content.

EXAMPLE 23

3 g of PVA Vinol ® 107 is dissolved in 27 g of DMSO at 60° C. under nitrogen. After the solution is cooled to room temperature 500 μl allyl isocyanate (Aldrich, 98%) (13.5 mole % isocyanate with respect to vinyl alcohol units) is slowly added and allowed to react for 3 days at room temperature (complete disappearance of isocyanate IR band at 2270 cm⁻¹). Methyl methacrylate and initiator are dissolved in this solution in proportions indicated in the table below. The solutions are poured into sandwich molds and U.V. irradiated for 1 hour at room temperature. As a comparison sample, allyl isocyanate (undiluted) with added initiator is irradiated for 5 hours at room temperature.

| Sample | Allyl Wt. % | Iso-cyan-ate Mole % | PVA Wt. % | MMA Wt. % | Initiator Wt. % | DMSO Wt. % | Observation |
|---|---|---|---|---|---|---|---|
| Control 1 | 1.6 | 13.5 | 9.83 | — | 0.03[1] | 88.54 | Liquid, no film or gel |
| 2 | 1.6 | 13.5 | 9.73 | 1.06 | 0.03[1] | 87.58 | ↓ |
| Control 3 | 3.8 | 21.0 | 9.58 | — | 0.4[2] | 86.23 | ↓ |
| Control 4 | 98.9 | — | — | — | 1.1[1] | 0 | ↓ |

[1]1-hydroxycyclohexylphenyl ketone
[2]benzoin methylether

As shown above (Samples 1 to 3), the allyl derivatized PVA is not U.V. crosslinked into a gel. Also allyl isocyanate itself (neat) is not polymerized into a gel (sample 4).

EXAMPLE 24

This example illustrates the effect of low isocyanatoethyl methacrylate (IEM) content and added comonomer, methyl methacrylate (MMA), on various physical properties of films. PVA solutions are made according to Example 1. IEM is added dropwise under nitrogen and % IEM content by weight can be determined from the table. Sheets are polymerized with MMA (controls do not have MMA) as in Example 1 with benzoin methyl ether (initiator) as indicated in the table below. In some cases extra DMSO is added to help dissolve the MMA.

| | | Wt. % | | | | | % Diameter Change | Observation | |
|---|---|---|---|---|---|---|---|---|---|
| Sample # | Mole % IEM | PVA + IEM in DMSO | % PVA | % MMA | % BME | % H₂O Content | (Initial to Boiled) | After Irradiation | After Swelling in Water and Boiling |
| 1 Control | 1.0 | 10.30 | 100 | 0 | 0.05 | — | — | viscous solution | — |
| 2 | ↓ | ↓ | 74.5 | 25.4 | 0.04 | — | — | clear, soft, gel | — |
| 3 | ↓ | ↓ | 49.5 | 50.5 | 0.08 | — | — | clear, soft, gel | — |
| 4 | ↓ | 8.72 | 25.0 | 75.0 | 0.04 | — | — | viscous solution | — |
| 5 Control | 1.5 | 10.47 | 100 | 0 | 0.05 | — | — | clear, soft, tacky film | — |
| 6 | ↓ | ↓ | 65 | 35.0 | 0.05 | 75.78 | −21.0 | — | clear, flexible film |
| 7 | ↓ | ↓ | 49.7 | 50.3 | 0.05 | 72.87 | −22.7 | — | clear, flexible film |
| 8 | ↓ | 8.94 | 24.9 | 75.1 | 0.06 | — | — | clear, soft film | opaque, flexible film |
| 9 Control | 2.0 | 10.63 | 100 | 0 | 0.05 | — | +12.0 | — | clear, very weak film |
| 10 | ↓ | ↓ | 39.3 | 60.7 | 0.06 | 60.86 | −27.4 | — | clear, flexible film |
| 11 | ↓ | ↓ | 24.9 | 75.1 | 0.14 | — | −27.7 | clear, in film | opaque, flexible film |
| 12 | 2.1 | 10.65 | 78.8 | 21.2 | 0.09 | 82.66 | −13.0 | — | clear, weak film |
| 13 | ↓ | ↓ | 65.6 | 34.4 | 0.06 | 74.64 | −17.4 | — | clear, flexible film |

As shown above a clear soft gel can be made using as little as 1 mole % IEM with MMA as additional comonomer. At 2.0 mole % IEM film clarity is maintained with up to 61 to 75% MMA.

What is claimed is:

1. An organic aprotic solvent insoluble polymer which is a derivative of a polyvinyl alcohol having a weight average molecular weight of at least about 2,000, containing an amount between about 0.5 to 90 percent, based on the number of hydroxyl groups on said polyvinyl alcohol, of an addition polymerization reaction product of (i) units of the formula

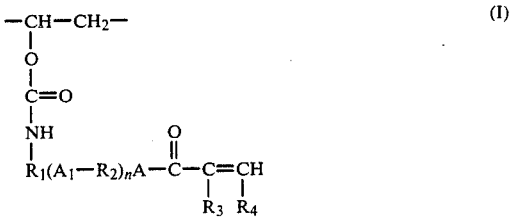

wherein

R₁ and R₂ are independently straight or branched chain alkylene of 2 to 8 carbon atoms, arylene of 6 to 12 carbon atoms, a saturated cycloaliphatic divalent group of 6 to 10 carbon atoms, aralkylene of 7 to 14 carbon atoms, or aralkarylene of 13 to 16 carbon atoms;

n is 0 or 1'

A₁ is

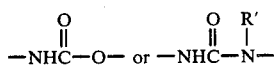

where R' is hydrogen or lower alkyl;
A is —O—, —NH— or

where R" is hydrogen or lower alkyl;
R₃ is hydrogen or methyl; and
R₄ is hydrogen, methyl or —COOR₅ where R₅ is hydrogen or lower alkyl with the proviso that if R₃ is methyl, R₄ is hydrogen;

and (ii) a vinylic monomer selected from
(a) hydrophilic monomers selected from hydroxy substituted lower alkyl acrylates and methacrylates, acrylamide, methacrylamide, C₁-C₂ lower alkyl acrylamide and methacrylamide, ethoxylated acrylates and methacrylates, hydroxy substituted lower alkyl acrylamide and methacrylamide, hydroxy substituted lower alkyl vinyl ethers, sodium ethylene sulfonate, sodium styrene sulfonate, 2-acrylamido-2-methylpropanesulfonic acid, N-vinylpyrrole, N-vinylsuccinimide, N-vinyl pyrrolidone, 2- and 4-vinyl pyridine, acrylic acid, methacrylic acid, (amino and quaternary ammonium)-(mono- or di-)lower alkylamino-lower alkyl(acrylates and methacrylates), and allyl alcohol;

(b) hydrophobic monomers selected from $C_1$ to $C_{18}$ alkyl acrylates and methacrylate, $C_3$ to $C_{18}$ alkyl acrylamides and methacrylamides, acrylonitrile, methacrylonitrile, vinyl $C_1$ to $C_{18}$ alkanoates, $C_2$ to $C_{18}$ alkenes, $C_2$ to $C_{18}$ haloalkenes, styrene, $C_1$ to $C_6$ alkyl styrenes, vinyl alkyl ethers wherein the alkyl portion has 1 to 6 carbon atoms, $C_3$–$C_{12}$ perfluoroalkyl ethyl thiocarbonylaminoethyl acrylates and methacrylates, $C_3$–$C_{12}$ fluoroalkyl acrylates and methacrylates, acryloxy and methacryloxy alkyl siloxanes, N-vinyl carbazole, and $C_1$–$C_{12}$ alkyl esters of maleic, fumaric, itaconic, and mesaconic acids; or (c) mixtures of a and b.

2. A polymer according to claim 1, wherein between about 0.01 and about 80 units of vinylic monomer are reacted per unit of formula I.

3. A polymer according to claim 2 where $R_1$ and $R_2$ are alkylene of 2 to 6 carbon atoms.

4. A polymer according to claim 3 wherein n is zero and A is oxa.

5. A polymer according to claim 2 wherein the polymer contains from at least about 1 percent to about 90 percent of units of formula I, based on the number of hydroxyl groups on the polyvinyl alcohol.

6. A polymer according to claim 5, wherein the polyvinyl alcohol contains at least about 1 up to about 20 percent units of formula I based upon the number of hydroxyl groups on said polyvinyl alcohol, which are reacted with about 0.5 to about 30 units of either a hydrophobic vinylic monomer or, a mixture of hydrophobic and hydrophilic vinylic monomers containing at least 50 percent by weight of hydrophobic monomer based upon the total weight of said vinylic monomers, based upon the units of formula I.

7. A polymer according to claim 5, wherein the polyvinyl alcohol contains from about 20 up to about 50 percent units of formula I based on the number of hydroxyl groups on said polyvinyl alcohol, which are reacted with about 0.01 to about 10 units of vinylic monomer, wherein up to about 80 weight percent of the total vinylic monomer is hydrophilic, per the unit of formula I in the polymer.

8. A polymer according to claim 5, wherein the polyvinyl alcohol contains from about 50 to about 90 percent units of formula I based on the number of hydroxyl groups on said polyvinyl alcohol, which are reacted with about 0.01 to about 10 units of said vinylic monomer, per unit of formula I in the polymer; said vinylic monomer being either said hydrophilic monomer or a mixture of said hydrophilic and said hydrophobic monomers, which mixture is at least 50% by weight hydrophilic.

9. A hydrogel contact lens made of the polymer of claim 1.

10. A hydrogel contact lens made of the polymer of claim 2.

11. A hydrogel contact lens made of the polymer of claim 6.

12. A hydrogel contact lens made of the polymer of claim 7.

13. A hydrogel contact lens made of the polymer of claim 8.

* * * * *